(12) United States Patent
Martinez De La Cruz et al.

(10) Patent No.: US 12,231,432 B2
(45) Date of Patent: Feb. 18, 2025

(54) SELECTION OF SERVICE-PROVIDING NETWORK FUNCTIONS IN A 3GPP COMMUNICATION NETWORK

(71) Applicant: Telefonaktiebolaget LM Ericsson (publ), Stockholm (SE)

(72) Inventors: Pablo Martinez De La Cruz, Madrid (ES); Francisco Javier Garcia Garcia, Madrid (ES); Jesus Angel De Gregorio Rodriguez, Madrid (ES); Maria Esther Bas Sanchez, Madrid (ES)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 212 days.

(21) Appl. No.: 17/798,533

(22) PCT Filed: Jan. 21, 2021

(86) PCT No.: PCT/EP2021/051327
§ 371 (c)(1),
(2) Date: Aug. 9, 2022

(87) PCT Pub. No.: WO2021/160403
PCT Pub. Date: Aug. 19, 2021

(65) Prior Publication Data
US 2023/0083529 A1    Mar. 16, 2023

(30) Foreign Application Priority Data

Feb. 12, 2020  (EP) .................................... 20382095

(51) Int. Cl.
*G06F 21/00* (2013.01)
*H04L 9/40* (2022.01)
(52) U.S. Cl.
CPC ............................... *H04L 63/102* (2013.01)

(58) Field of Classification Search
CPC ...... H04L 63/102; H04L 67/51; H04L 63/205
See application file for complete search history.

(56) References Cited

U.S. PATENT DOCUMENTS

| 2019/0238425 A1 | 8/2019 | Mladin et al. |
| 2019/0253894 A1 | 8/2019 | Bykampadi et al. |
| (Continued) | | |

FOREIGN PATENT DOCUMENTS

| KR | 20190088878 A | 7/2019 |
| WO | 2019001376 A1 | 1/2019 |
| WO | 2019034609 A1 | 2/2019 |

OTHER PUBLICATIONS

International Search Report and Written Opinion of the International Searching Authority for PCT International Application No. PCT/EP2021/051327 dated Mar. 3, 2021.

(Continued)

*Primary Examiner* — Ghazal B Shehni
(74) *Attorney, Agent, or Firm* — Sage Patent Group (57) ABSTRACT

There is provided mechanisms for enabling selection of service-providing NFs in a 3GPP communication network. A method is performed by an NRF. The method comprises obtaining one register request from each of the service-providing NFs. Each registration request comprises an NF profile. Each NF profile comprises a security setting attribute. The method comprises storing the NF profiles of the service-providing NFs. The method comprises obtaining a discovery request from a service-requesting NF. The request indicates an NF type. The method comprises providing a discovery response to the service-requesting NF. The discovery response comprises the NF profile of at least one of the service-providing NFs of the NF type, thereby enabling selection of the service-providing NFs. The security setting (Continued)

attribute may pertain to support for mutual TLS and/or for use of OAuth-2 based authorization.

14 Claims, 8 Drawing Sheets

(56) References Cited

U.S. PATENT DOCUMENTS

| | | | |
|---|---|---|---|
| 2020/0028920 A1* | 1/2020 | Livanos | H04W 8/26 |
| 2020/0127916 A1 | 4/2020 | Krishan | |
| 2021/0258871 A1* | 8/2021 | Jeong | H04W 8/065 |

OTHER PUBLICATIONS

3GPP TS 29.510 V16.2.0, "3rd Generation Partnership Project; Technical Specification Group Core Network and Terminals; 5G System; Network Function Repository Services; Stage 3 (Release 16)," Dec. 2019, 167 pages.
3GPP TS 23.501 V16.2.0, "3rd Generation Partnership Project; Technical Specification Group Services and System Aspects; System Architecture for the 5G System (5GS); Stage 2 (Release 16)," Sep. 2019, 391 pages.
3GPP TS 23.501 V16.3.0, "3rd Generation Partnership Project; Technical Specification Group Services and System Aspects; System architecture for the 5G System (5GS); Stage 2 (Release 16)," Dec. 2019, 417 pages.
3GPP TS 29.510 V16.1.0, "3rd Generation Partnership Project; Technical Specification Group Core Network and Terminals; 5G System; Network Function Repository Services; Stage 3 (Release 16)," Sep. 2019, 150 pages.
3GPP TS 33.501 V16.0.0, "3rd Generation Partnership Project; Technical Specification Group Services and System Aspects; Security architecture and procedures for 5G system (Release 16)," Sep. 2019, 196 pages.
3GPP TS 33.501 V16.1.0, "3rd Generation Partnership Project; Technical Specification Group Services and System Aspects; Security architecture and procedures for 5G system (Release 16)," Dec. 2019, 202 pages.
Elvin Cheng, "An Introduction to Mutual SSL Authentication," Code Project, https://www.codeproject.com/Articles/326574/An-Introduction-to-Mutual-SSL-Authentication, Feb. 2012, 10 pages.
Wikipedia, "X.509," https://en.wikipedia.org/wiki/X.509, page was last edited on Nov. 6, 2019, 15 pages.
Office Action and Search Report for Chinese Patent Application No. 202180013979.4, mailed Sep. 7, 2023, 10 pages.
Nokia, "Updates to NF service framework and NRF services for CHF discovery and selection, " S2-187949, 3GPP TSG-SA WG2 Meeting #128 Bis, Sophia-Antipolis, France, Aug. 20-24, 2018, 6 pages.
Office Action for Canadian Patent Application No. 3,168,264 mailed Nov. 22, 2023, 7 pages.

* cited by examiner

SELECTION OF SERVICE-PROVIDING NETWORK FUNCTIONS IN A 3GPP COMMUNICATION NETWORK

CROSS REFERENCE TO RELATED APPLICATIONS

This application is a 35 U.S.C. § 371 national stage application of PCT International Application No. PCT/EP2021/051327 filed on Jan. 21, 2021, which claims the benefit of European Patent Application No. 20382095.6, filed on Feb. 12, 2020, the disclosures and content of which are incorporated by reference herein in their entireties.

TECHNICAL FIELD

Embodiments presented herein relate to a method, a Network Repository Function, a computer program, and a computer program product for selection of service-providing Network Functions in a 3GPP communication network. Further embodiments presented herein relate to a method, a service-requesting Network Function, a computer program, and a computer program product for discovery of a service-providing Network Function in a 3GPP communication network. Further embodiments presented herein relate to a method, a service-providing Network Function, a computer program, and a computer program product for enabling selection of the service-providing Network Function in a 3GPP communication network.

BACKGROUND

The Core Network (CN) of the fifth generation (5G) telecommunication network comprises functional entities called Network Functions (NFs). System functionality is achieved by a set of NFs providing services to other authorized NFs to access their services. An NF service is one type of capability exposed by a NF service Producer to other authorized NF service consumers, through a service-based interface (SBI). An NF service may support one or more NF service operation(s).

Selection of services produced by NFs of the 5G Core Network is supported by a Network Repository Function (NRF). Service-providing NFs (also referred to as Producer NFs) exposing services register a profile within the NRF describing the services offered by the NFs and how to consume them. Service-requesting NFs (also referred to as Consumer NFs) query the NRF for services being consumed, to obtain the required service information. To do so, the NRF maintains a profile (denoted NF profile) of the NF instances and their supported services. The NRF accepts registration information of the NF producers and provides discovery information of NF instances to NF consumers. NF profiles are described in section 6.1.6.2 of 3GPP TS 29.510, entitled "5G System; Network function repository services; Stage 3", version 16.2.0. An NF profile comprises information about a service-providing NF, including among other types of information, addressing details (that is, information about the endpoints that can be used to consume services from the service-providing NF), and security information (indicating if security is required to consume these services). The attributes for NF profiles and NF services are described in sections 6.1.6.2.2 and 6.1.6.2.3, respectively, of aforementioned 3GPP TS 29.510.

When an NF is instantiated, it registers, according to an NF service registration procedure, with the NRF the services that it is producing. Whenever any of the pieces of registration data is needed, or periodically, the NF produces might update its registration data with the NRF.

The selection of services and NFs providing them is thus provided by the NRF which support the following services: Nnrf_NFManagement, Nnrf_NFDiscovery, Nnrf_AccessToken Service, and Nnrf_Bootstrapping. Nnrf_NFManagement allows an NF to register, update or deregister its profile in the NRF. In this respect, the NFRegister, NFUpdate, and NFDeregister operations allow an NF to register, update, and deregister its own NF profile in the NRF, respectively. The NFStatusSubscribe and NFStatusUnsubscribe operations allow an NF to subscribe and unsubscribe to changes in the status of NFs registered in the NRF. The NFStatusNotify operation allows the NRF to notify subscribed NF instances of changes on the status of NF instances. Nnrf_NFDiscovery allows an NF to discover services offered by other NFs, by querying the NRF. It has a single operation, NFDiscover, which allows an NF to discover other NFs of services of a given type. The Nnrf_AccessToken service allows an NF to request OAuth2 tokens to the NF for accessing other NFs. The Nnrf_Bootstrapping service concerns bootstrapping and allows an NF to discover services offered by the NRF itself, along with their respective application programming interface (API) versions.

When an NF consumer, such as an Access and Mobility Management Function, needs to discover another NF, such a Session Management Function or a Unified Data Management function, or a particular service provided by another NF, the NF consumer invokes an NF service discovery procedure. When an NF consumer needs to discover another NF (i.e., an NF producer) or another NF service, the NF consumer invokes Nnrf_NFDiscovery services.

Authentication and authorization between NFs is specified in chapter 13.3.2 of 3GPP TS 33.501, entitled "Security architecture and procedures for 5G System", version 16.1.0.

In short, depending on whether token-based authorization is used or not, authentication between NFs is performed in one of the following ways. If token-based authorization is used within one Public Land Mobile Network (PLMN), the service-requesting NF shall authenticate the service-providing NF at transport layer before trying to access the service API. The service-providing NF might authenticate the service-requesting NF at transport layer. Authentication of the service-requesting NF towards the service-providing NF will be implicit by authorization, which can only be granted after successful authentication of the service-requesting NF towards the NRF. If token-based authorization is not used within one PLMN, the service-requesting NF and the service-providing NF mutually authenticate before performing access to the service API. The service-providing NF additionally checks authorization of the service-requesting NF based on a local policy before granting access to the service API.

However, it could still be cumbersome for the service-requesting NF to select a service-providing NF in an efficient manner.

Hence, there is still a need for improved mechanisms for selection of service-providing NFs in a 3GPP communication network.

SUMMARY

An object of embodiments herein is to enable efficient selection of service-providing NFs in a 3GPP communication network.

According to a first aspect there is presented a method for enabling selection of service-providing NFs in a 3GPP communication network. The method is performed by an NRF. The method comprises obtaining one register request from each of the service-providing NFs. Each registration request comprises an NF profile. Each NF profile comprises a security setting attribute. The method comprises storing the NF profiles of the service-providing NFs. The method comprises obtaining a discovery request from a service-requesting NF. The request indicates an NF type. The method comprises providing a discovery response to the service-requesting NF. The discovery response comprises the NF profile of at least one of the service-providing NFs of the NF type, thereby enabling selection of the service-providing NFs.

According to a second aspect there is presented an NRF for enabling selection of service-providing NFs in a 3GPP communication network. The NRF comprises processing circuitry. The processing circuitry is configured to cause the NRF to obtain one register request from each of the service-providing NFs. Each registration request comprises an NF profile. Each NF profile comprises a security setting attribute. The processing circuitry is configured to cause the NRF to store the NF profiles of the service-providing NFs. The processing circuitry is configured to cause the NRF to obtain a discovery request from a service-requesting NF. The request indicates an NF type. The processing circuitry is configured to cause the NRF to provide a discovery response to the service-requesting NF. The discovery response comprises the NF profile of at least one of the service-providing NFs of the NF type, thereby enabling selection of the service-providing NFs.

According to a third aspect there is presented a computer program for enabling selection of service-providing NFs in a 3GPP communication network. The computer program comprises computer program code which, when run on processing circuitry of an NRF, causes the NRF to perform a method according to the first aspect.

According to a fourth aspect there is presented a method for selection of a service-providing NF in a 3GPP communication network. The method is performed by a service-requesting NF. The method comprises providing a discovery request to an NRF. The request indicates an NF type. The method comprises obtaining a discovery response from the NRF. The discovery response comprises at least one NF profile of at least one service-providing NF of the NF type. Each at least one NF profile comprises a security setting attribute. The service-requesting NF is thereby enabled to select the service-providing NF.

According to a fifth aspect there is presented a service-requesting NF for selection of a service-providing NF in a 3GPP communication network. The service-requesting NF comprises processing circuitry (310). The processing circuitry is configured to cause the service-requesting NF to provide a discovery request to an NRF. The request indicates an NF type. The processing circuitry is configured to cause the service-requesting NF to obtain a discovery response from the NRF. The discovery response comprises at least one NF profile of at least one service-providing NF of the NF type. Each at least one NF profile comprises a security setting attribute. The service-requesting NF is thereby enabled to select the service-providing NF.

According to a sixth aspect there is presented a computer program for selection of a service-providing NF in a 3GPP communication network. The computer program comprises computer program code which, when run on processing circuitry of a service-requesting NF, causes the service-requesting NF to perform a method according to the fourth aspect.

According to a seventh aspect there is presented a method for enabling selection of a service-providing NF in a 3GPP communication network. The method is performed by the service-providing NF. The method comprises providing a register request to an NRF. The registration request comprises an NF profile. The NF profile comprises a security setting attribute.

According to an eight aspect there is presented a service-providing NF for enabling selection of the service-providing NF in a 3GPP communication network. The service-providing NF comprises processing circuitry. The processing circuitry is configured to cause the service-providing NF to provide a register request to an NRF. The registration request comprises an NF profile. The NF profile comprises a security setting attribute.

According to a tenth aspect there is presented a computer program for enabling selection of a service-providing NF in a 3GPP communication network, the computer program comprising computer program code which, when run on processing circuitry of a service-providing NF, causes the service-providing NF to perform a method according to the seventh aspect.

According to an eleventh aspect there is presented a computer program product comprising a computer program according to at least one of the third aspect, the sixth aspect, and the tenth aspect and a computer readable storage medium on which the computer program is stored. The computer readable storage medium can be a non-transitory computer readable storage medium.

According to twelfth aspect there is presented a system. The system comprises an NRF as herein disclosed, a service-requesting NF as herein disclosed, and a service-providing NF as herein disclosed.

Advantageously these aspects provide efficient selection of service-providing NFs in a 3GPP communication network.

Advantageously these aspects facilitate selection of NFs as service endpoints of a discovery result in such a way that unsuccessful connection attempts are minimized due to incompatible security setting attributes.

Advantageously these aspects provide mechanisms for optimizing signaling between the NFs by reducing unnecessary token management for those service endpoints that do not require tokes and also minimizes unsuccessful connection attempts when such tokes are required but not supported.

Advantageously these aspects simplify the operation of a 5G 3GPP communication network, reducing the probability of errors due to manual intervention and configuration errors with respect to security setting attributes.

Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein.

All references to "a/an/the element, apparatus, component, means, module, action, etc." are to be interpreted openly as referring to at least one instance of the element, apparatus, component, means, module, action, etc., unless explicitly stated otherwise. The actions of any method disclosed herein do not have to be performed in the exact order disclosed, unless explicitly stated.

BRIEF DESCRIPTION OF THE DRAWINGS

The inventive concept is now described, by way of example, with reference to the accompanying drawings, in which.

DETAILED DESCRIPTION

The inventive concept will now be described more fully hereinafter with reference to the accompanying drawings, in which certain embodiments of the inventive concept are shown. This inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description. Any action or feature illustrated by dashed lines should be regarded as optional.

Figure 1:
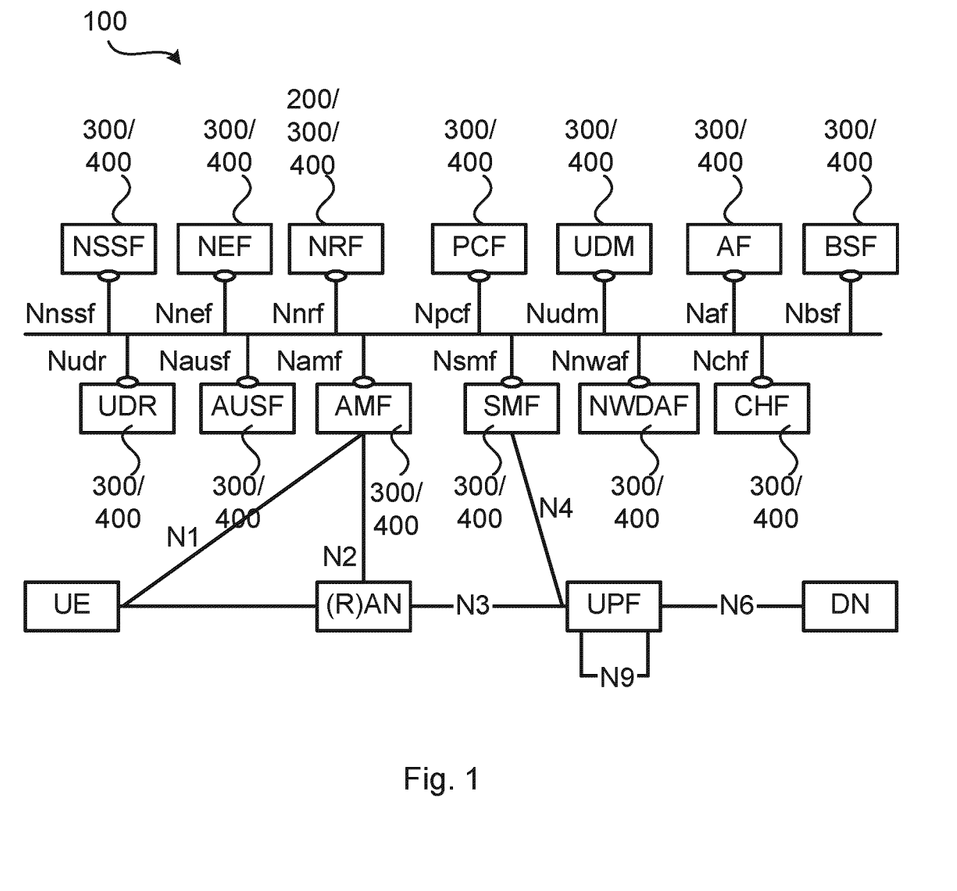
FIG. 1 is a schematic diagram illustrating a communication network according to embodiments.

FIG. 1 is a schematic diagram illustrating a communication network 100 where embodiments presented herein can be applied. The communication network 100 represents a reference architecture of a fifth generation telecommunication system (5GS) and comprises the following entities: and Authentication Server Function (AUSF), an Access and Mobility Management Function (AMF), a Data Network (DN), e.g. operator services, Internet access or 3rd party services, a Network Exposure Function (NEF), a Network Repository Function (NRF), a Network Slice Selection Function (NSSF), a Policy Control Function (PCF), a Session Management Function (SMF), a Unified Data Management (UDM) function, a Unified Data Repository (UDR), a User Plane Function (UPF), an Application Function (AF), a User Equipment (UE), a (Radio) Access Network ((R)AN), a Network Data Analytics Function (NWDAF), a Binding Support Function (BSF), and a Charging Function (CHF). Service based interfaces are represented by the format Nxyz (e.g., Nnssf, Nnef, etc.) and point to point interfaces are represented by the format Nx (e.g. N1, N2, etc.). The NSSF, NEF, NRF, PCF, UDM, AF, BSF, UDR, AUSF, AMF, SMF, NWDAF, and CHF are all examples of possible NF producers (hereinafter denoted service-producing NFs 400) and possible NF consumers (hereinafter denoted service-requesting NFs 300).

As noted above there is a need for improved mechanisms for selection of service-providing NFs in a 3GPP communication network.

In more detail, the NF services within an NF profile have an attribute, named a scheme, that indicates if the NF service shall be consumed using the Hypertext Transfer Protocol (HTTP) or Hypertext Transfer Protocol Secure (HTTPS). Currently, a service-requesting NF does not know beforehand if it will be required to present a client certificate until an actual connection attempt is made, and as part of the handshake performed during signalling of the Transport Layer Security (TLS) protocol, the service-providing NF requests it. This causes a problem when the service-requesting NF is not configured with client certificates to use, because the service-requesting NF will attempt service requests to service-providing NFs that will not be successful.

In further detail, currently, a service-requesting NF does not know beforehand whether if it shall use OAuth2 or not. This causes several problems. When the service-requesting NF does not support OAuth2 tokens, or it is not able to request them to the NRF, e.g. due to a transient failure in the communication with the NRF, the service requests to the service-providing NF will not be successful.

Conversely, when the service-providing NF does not require the use of OAuth2 tokens, it is unnecessary for the service-requesting NF to request them from the NRF before attempting the connection to the service-providing NF (and whenever the tokens expire) and to include the tokens in every request. A service-providing NF that does not require Oauth2 tokens, upon a reception of a request containing such a token, cannot indicate that such tokens are not required without triggering an authentication failure, which has other implications. This results in unneeded signaling and an inefficient usage of networking and computing resources.

Operator local defined policies can be used to mitigate and/or prevent the above problems. However, a static configuration is difficult to manage, and error-prone, and defeats the purpose of dynamic service discovery that the NRF provides.

It is one object of the herein disclosed embodiments to alleviate the aforementioned problems.

As will be further disclosed below, according to at least some of the herein disclosed embodiments, the NF profiles stored by the NRF 200 are extended with two additional attributes. An mtlsRequired attribute indicates the TLS mode that the service-providing NF requires, either "server" or "mutual" and is set to "true" if the service-providing NF requires mutual TLS and the Service-requesting NF is required to present a client certificate, and else is set to "false". An oauth2Required attribute indicates whether the service-providing NF requires the usage of OAuth2 tokens or not and is set to "true", if the service-providing NF requires OAuth2, and else is set to "false".

As will be further disclosed below, according to at least some of the herein disclosed embodiments, Uniform Resource Identifier (URI) query parameters are extended with the above mentioned two additional attributes; the mtlsRequired attribute and the oauth2Required attribute.

As will be further disclosed below, according to at least some of the herein disclosed embodiments there is disclosed a method to query and/or process these attributes for the applicable NF profiles in order to filter out those service-providing NFs that have incompatible TLS modes or OAuth2 requirements.

As will be further disclosed below, according to at least some of the herein disclosed embodiments there is disclosed a method to determine if the service-requesting NF shall include OAuth2 tokens in the service requests to a service-providing NF.

The embodiments disclosed herein in particular relate to mechanisms for selection of service-providing NFs 400 and for enabling such selection. In order to obtain such mechanisms there is provided an NRF 200, a method performed by the NRF 200, a computer program product comprising code, for example in the form of a computer program, that when run on processing circuitry of the NRF 200, causes the NRF 200 to perform the method. In order to obtain such mechanisms there is further provided a service-requesting NF 300, a method performed by the service-requesting NF 300, and a computer program product comprising code, for example in the form of a computer program, that when run on processing circuitry of the service-requesting NF 300, causes the service-requesting NF 300 to perform the method. In order to obtain such mechanisms there is further provided a service-providing NF 400, a method performed by the service-providing NF 400, and a computer program product comprising code, for example in the form of a computer program, that when run on processing circuitry of the service-providing NF 400, causes the service-providing NF 400 to perform the method.

Figure 2:
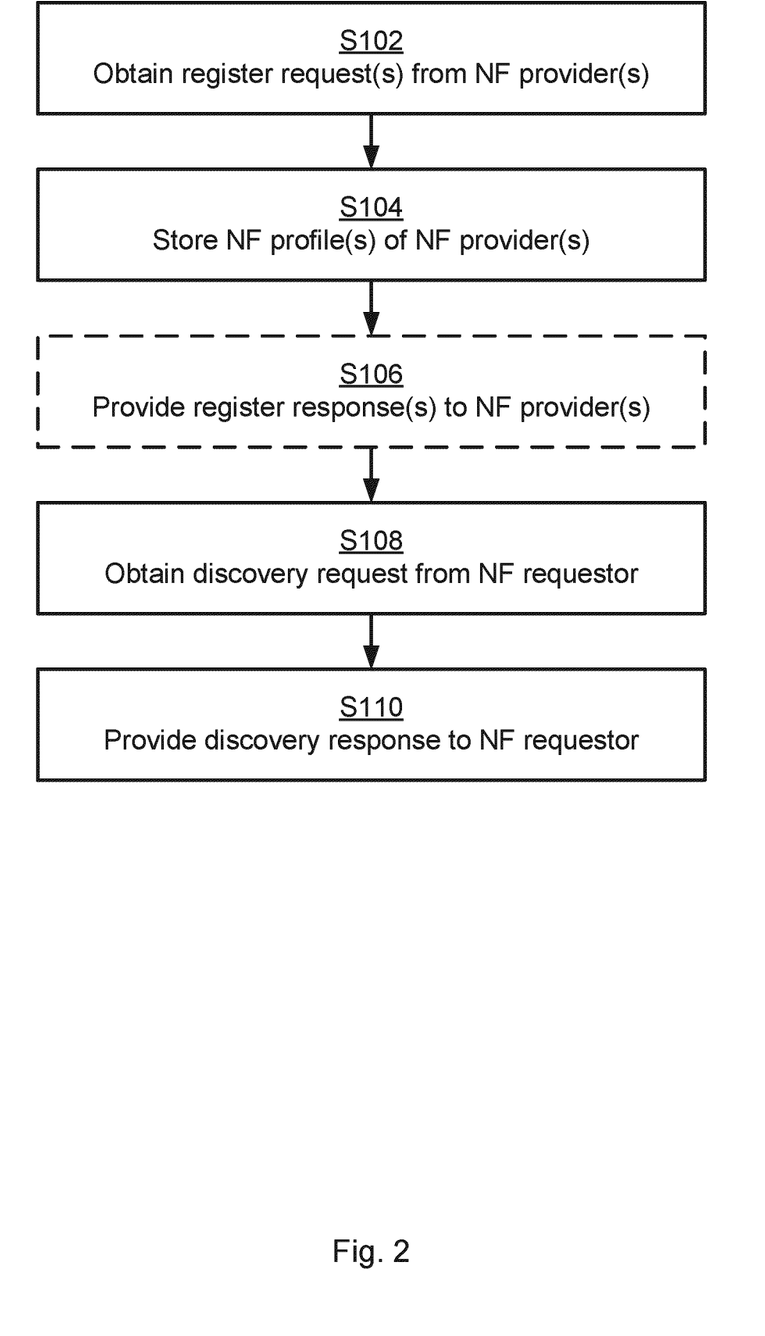
FIGS. 2, 3, and 4 are flowcharts of methods according to embodiments.

Reference is now made to FIG. 2 illustrating a method for enabling selection of service-providing NFs 400 in a 3GPP communication network as performed by the NRF 200 according to an embodiment.

As will be further disclosed below, each service-providing NF 400 registers its NF profile with the NRF 200. It is assumed that the request for registration of the NF profile eventually is received by the NRF 200. Thus, the NRF 200 is configured to perform action S102:

S102: The NRF 200 obtains one register request from each of the service-providing NFs 400. Each registration request comprises an NF profile. Each NF profile comprises a security setting attribute. Examples of security setting attributes will be disclosed below.

The NRF 200 then stores the NF profiles. Thus, the NRF 200 is configured to perform action S104:

S104: The NRF 200 stores the NF profiles of the service-providing NFs 400.

As will be further disclosed below, a service-requesting NF 300 provides a request to the NRF 200, where the request specifies the NF type of the service requested by the service-requesting NF 300. It is assumed that this request eventually is received by the NRF 200. Thus, the NRF 200 is configured to perform action S108:

S108: The NRF 200 obtains a discovery request from a service-requesting NF 300.

The request indicates an NF type.

The NRF 200 then responds to the service-requesting NF 300 with one or more NF profiles of the NF type. Thus, the NRF 200 is configured to perform action Silo:

Silo: The NRF 200 provides a discovery response to the service-requesting NF 300. The discovery response comprises the NF profile of at least one of the service-providing NFs 400 of the NF type. The NRF 200 thereby enables selection of the service-providing NFs 400.

Embodiments relating to further details of enabling selection of service-providing NFs 400 in a 3GPP communication network as performed by the NRF 200 will now be disclosed.

In some aspects, the NRF 200 responds to the service-providing NFs 400 to acknowledge receipt of the NF profiles. In particular, according to an embodiment the NRF 200 is configured to perform (optional) action S106:

S106: The NRF 200 provides a register response to each of the service-providing NFs 400 upon having stored the NF profiles.

There could be different types of discovery requests obtained from the service-requesting NF 300 in S108, or different content of such discovery requests. In some embodiments, the discovery request comprises information of security setting attribute support at the service-requesting NF 300. As an example, the information of security setting attribute support at the service-requesting NF 300 might be provided in terms of a URI query parameter list. The NRF 200 might then in the discovery response provided in action Silo only include NF profiles with matching security setting attributes. That is, in some embodiments, only those NF profiles of which the security setting attribute matches the information of security setting attribute support are comprised in the discovery response in action S110.

Figure 3:
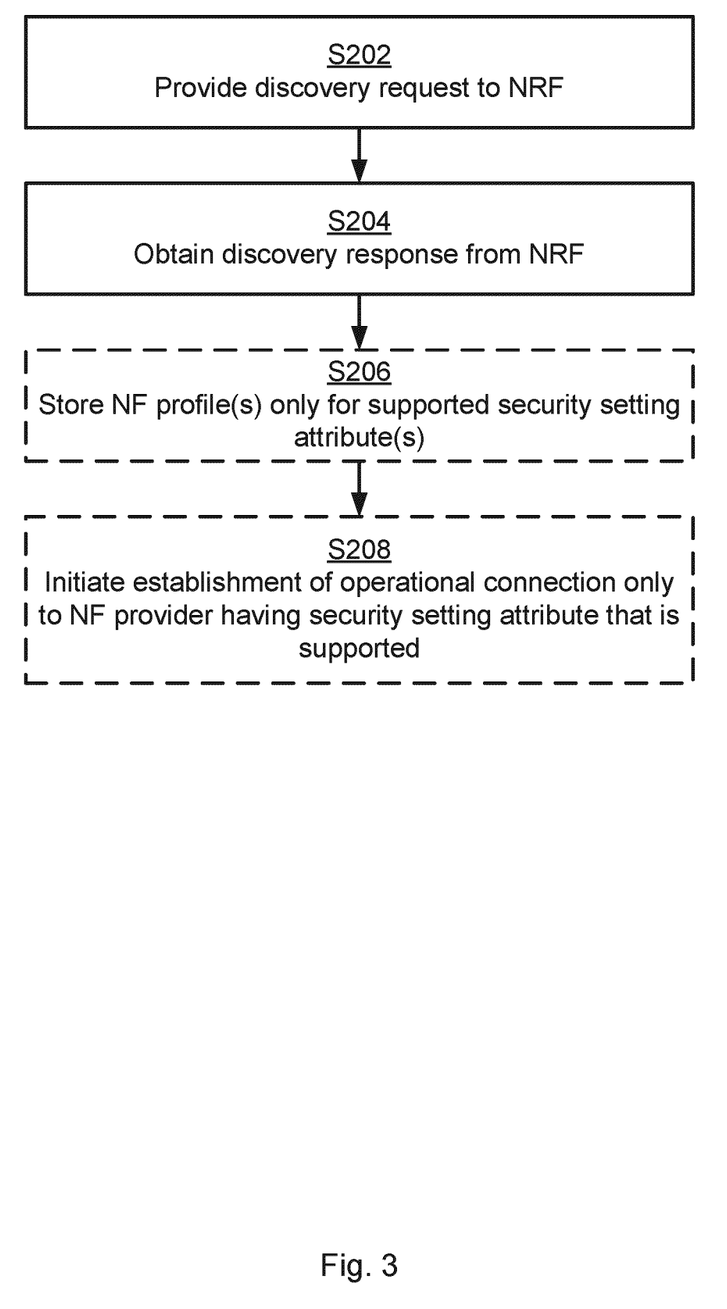

Reference is now made to FIG. 3 illustrating a method for selection of a service-providing NF 400 in a 3GPP communication network as performed by the service-requesting NF 300 according to an embodiment.

It is assumed that the service-requesting NF 300 intends to consume a service provided by at least one service-providing NF 400. The service-requesting NF 300 therefore provides a request to the NRF 200, where the request specifies the NF type of the service requested by the service-requesting NF 300. In particular, the service-requesting NF 300 is configured to perform action S202:

S202: The service-requesting NF 300 provides a discovery request to the NRF 200, where the request indicates an NF type.

As disclosed above, the NRF 200 in action Silo responds to the request. It is assumed that this response eventually is received by the service-requesting NF 300. Thus, the service-requesting NF 300 is configured to perform action S204:

S204: The service-requesting NF 300 obtains a discovery response from the NRF 200. As disclosed above, the discovery response comprises at least one NF profile of at least one service-providing NF 400 of the NF type. As further disclosed above, each at least one NF profile comprises a security setting attribute. The service-requesting NF 300 is thereby enabled to select the service-providing NF 400.

Embodiments relating to further details of selection of a service-providing NF 400 in a 3GPP communication network as performed by the service-requesting NF 300 will now be disclosed.

There may be different ways for the service-requesting NF 300 to handle aspects of the security setting attributes such that only service-providing NFs 400 having security setting attributes supported by the service-requesting NF 300 are considered when the service-requesting NF 300 intends to consume a service provided by at least one of the service-providing NFs 400. Different embodiments relating thereto will now be described in turn.

In some aspects, the service-requesting NF 300 does not include any information of its own support for security setting attributes in the discovery request. The service-requesting NF 300 might then in the discovery response obtained in S204 receive NF profiles of service-providing NFs 400 having security setting attributes not supported by the service-requesting NF 300. The service-requesting NF 300 might then filter out and discard those NF profiles of service-providing NFs 400 having security setting attributes not supported by the service-requesting NF 300 such that only NF profiles of service-providing NFs 400 having security setting attributes supported by the service-requesting NF 300 are stored. In particular, in some embodiments, the service-requesting NF 300 is configured to perform (optional) action S206:

S206: The service-requesting NF 300 stores the at least one NF profile only when its security setting attribute is supported at the service-requesting NF 300, and otherwise discarding the at least one NF profile.

In other aspects, the service-requesting NF 300 specifies information of its own support for security setting attributes in the discovery request. That is, in some embodiments, the discovery request comprises information of security setting attribute support at the service-requesting NF 300. As an example, the information of security setting attribute support at the service-requesting NF 300 might be provided in terms of a URI query parameter list. The service-requesting NF 300 might then in the discovery response obtained in S204 receive only NF profiles of service-providing NFs 400 having security setting attributes supported by the service-requesting NF 300. That is, in some embodiments, only those NF profiles of which the security setting attribute matches the information of security setting attribute support are comprised in the discovery response.

There could be different ways for the service-requesting NF 300 to determine the information of security setting attribute support at the service-requesting NF 300. In some embodiments, the information of security setting attribute support is determined by the checking which security setting attributes the service-requesting NF 300 supports, and where the information of security setting attribute support then lists only those security setting attributes that the service-requesting NF 300 supports.

Upon having obtained the discovery response from the NRF 200 in action S204, possibly followed by having filtered out, or discarded those NF profiles belonging to service-providing NFs 400 having security setting attributes not supported by the service-requesting NF 300, the service-requesting NF 300 might contact one of the remaining service-providing NFs 400 for accessing its service.

In particular, in some embodiments, the service-requesting NF 300 is configured to perform (optional) action S208:

S208: The service-requesting NF 300 initiates establishment of an operational connection only to one of the at least one service-providing NF 400 for which the security setting attribute is supported at the service-requesting NF 300.

Thus, for NF service invocation. a connection is established with a service-providing NF 400 according to the security setting attribute.

Figure 4:
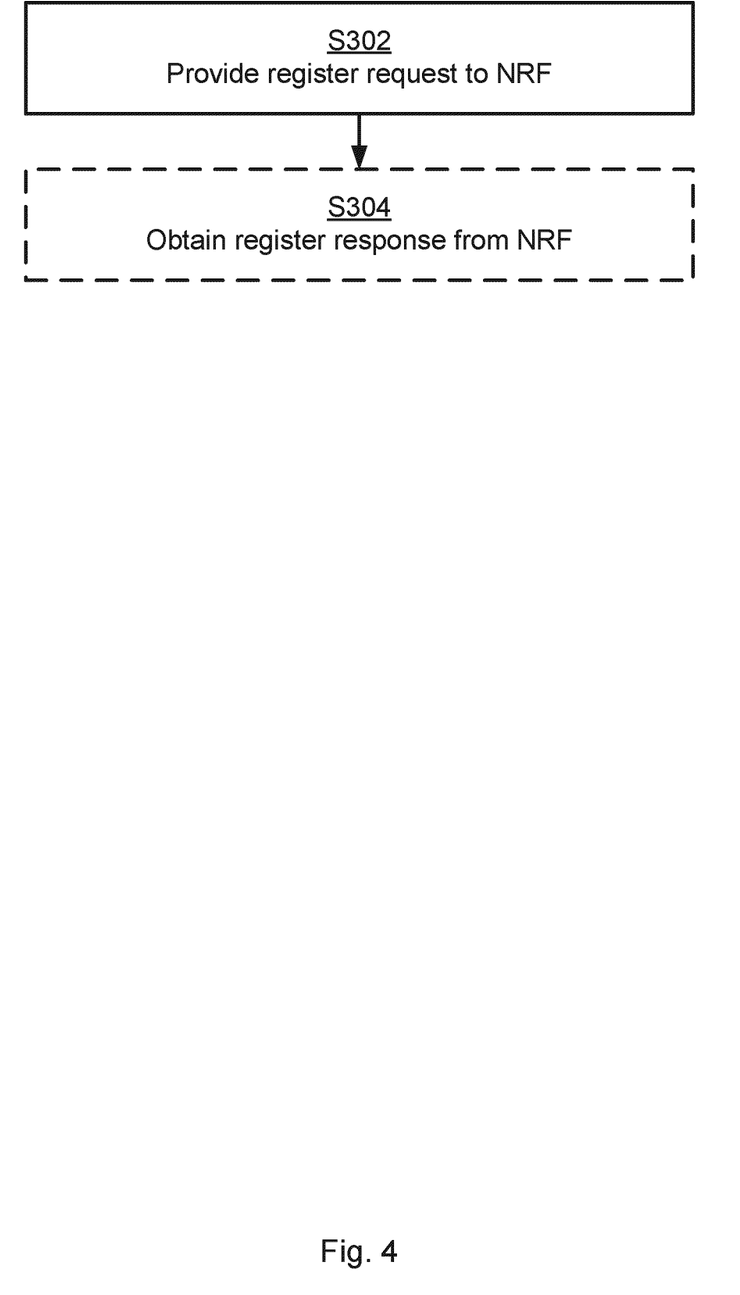

Reference is now made to FIG. 4 illustrating a method for enabling selection of a service-providing NF 400 in a 3GPP communication network as performed by the service-providing NF 400 according to an embodiment.

It is assumed that the NF profile of the service-providing NF 400 is either created or modified, for example by the service-providing NF 400 being instantiated or being reconfigured with new parameters that impacts the NF profile. As a consequence thereof the service-providing NF 400 registers its NF profile with the NRF 200. That is, the service-providing NF 400 is configured to perform action S302:

S302: The service-providing NF 400 provides a register request to an NRF 200. The registration request comprises an NF profile (of the service-providing NF 400). The NF profile comprises a security setting attribute.

Embodiments relating to further details of for enabling selection of a service-providing NF 400 in a 3GPP communication network as performed by the service-providing NF 400 will now be disclosed.

As disclosed above, in some aspects, the NRF 200 responds to the service-providing NF 400 upon having obtained the register request. Thus, according to an embodiment, the service-providing NF 400 is configured to perform (optional) action S304:

S304: The service-providing NF 400 obtains a register response from the NRF 200 upon having provided the NF profiles to the NRF 200.

Embodiments, aspects, and examples, applicable to any of the NRF 200, the service-requesting NF 400, and the service-providing NF 400, will now be disclosed.

As disclosed above, there could be different examples of security setting attributes. According to an embodiment, the security setting attribute pertains to support of mutual TLS and/or support of use of OAuth2-based authorization. The security setting attribute might be represented by a Boolean or value enumeration defining whether Oauth2-based authorization is required or not, and/or might be represented by a Boolean defining whether mutual TLS authorization is required or not.

In some aspects, the security setting attribute is valid for the whole NF profile.

That is, according to a first embodiment, the security setting attribute is set per NF profile. In other aspects, the security attribute is individually set per NF Service. That is, according to a second embodiment, the security setting attribute is set per service of the NF profile.

Figure 5:
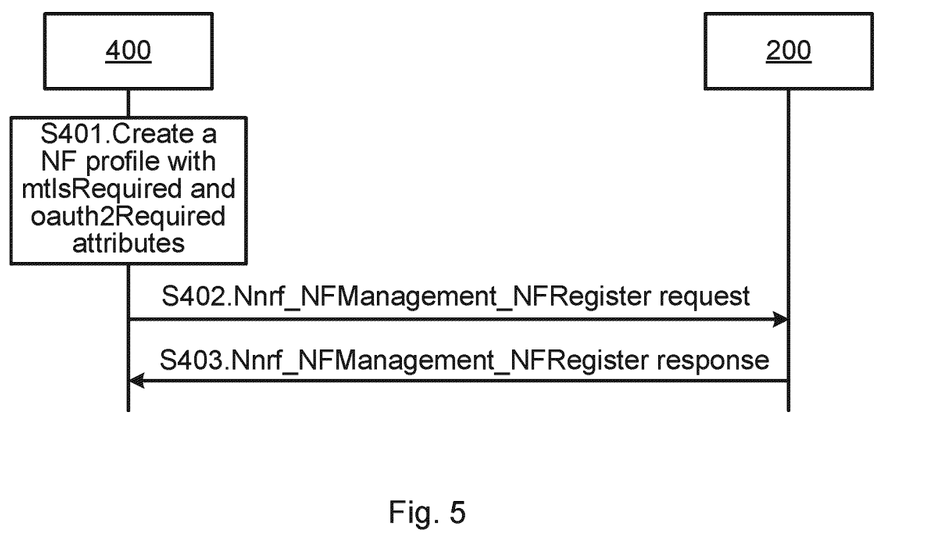
FIGS. 5, 6, 7, and 8 are signalling diagrams according to embodiments.

FIG. 5 is a signalling diagram for NF registration based on at least some of the above disclosed embodiments. As a precondition, it is assumed that the service-providing NF 400 is provisioned with the root and/or intermediate CA certificates used to sign its own certificate.

S401: The service-providing NF 400 creates an NF profile, including its NF type, e.g. UDM, and the following attributes, among others: mtlsRequired and oauth2Required.

S402: The service-providing NF 400 registers itself in the NRF 200 by sending a Nnrf_NFManagement NFRegister request to the NRF 200. The request includes the NF profile previously created.

S403: The NRF 200 stores the NF profile and returns a Nnrf_NFManagement NFRegister response to the service-providing NF 400.

Figure 6:
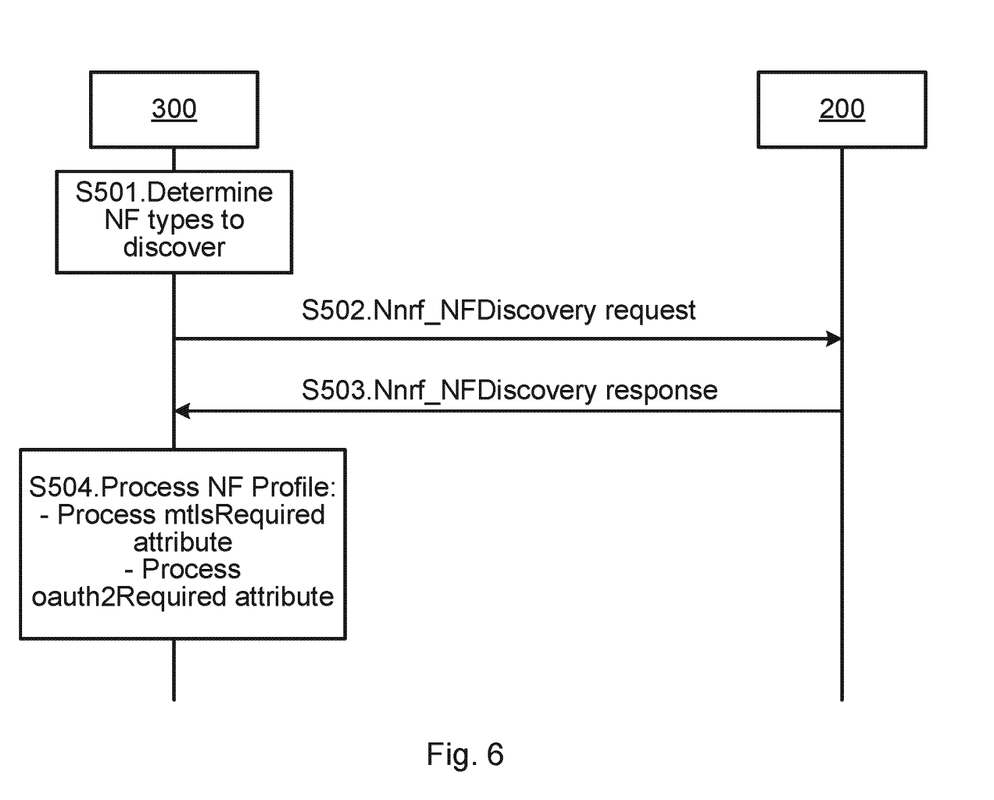

FIG. 6 is a signalling diagram for NF discovery based on at least some of the above disclosed embodiments.

S501: The service-requesting NF 300 identifies the NF types it requires to interact with, and for each of them, repeats actions S502 to S506.

S502: The service-requesting NF 300 sends an Nnrf_NF-Discovery request to the NRF 200 indicating the NF type as one selection criterion.

S503: The NRF 200 returns an Nnrf_NFDiscovery response, which contains a list of NF profiles matching the criteria.

S504: The service-requesting NF 300 processes the received NF profiles. For each NF profile the service-requesting NF 300 processes the mtlsRequired attribute. If the service-requesting NF 300 is not configured to use a client certificate, and the mtlsRequired attribute is equal to "true", the service-requesting NF 300 discards the NF profile. For each NF profile the service-requesting NF 300 processes the oauth2Required attribute. If the service-requesting NF 300 is not configured to use OAuth2 tokens, and the oauth2Required attribute is set to "true", the service-requesting NF 300 discards the NF profile. Otherwise, the service-requesting NF 300 stores the NF profile for later use.

Figure 7:
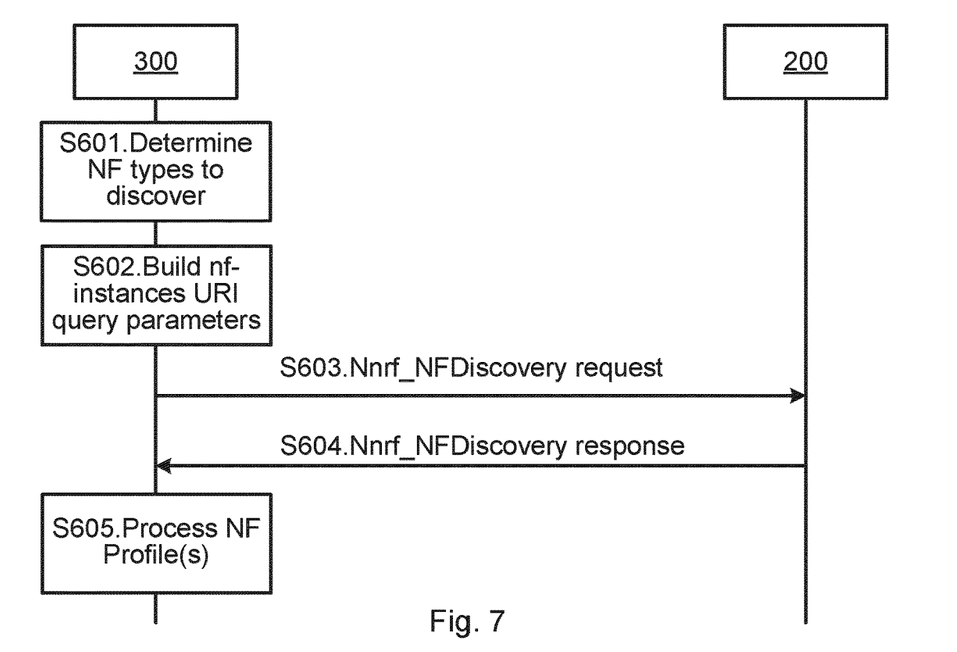

FIG. 7 is a signalling diagram for NF discovery with URI query parameters based on at least some of the above disclosed embodiments.

S601: The service-requesting NF 300 identifies the NF types it requires to interact with, and for each of them, repeats actions S602 to S605.

S602: The service-requesting NF 300 builds a URI query parameter list including the mtlsRequired and oauth2Required parameters as follows. If the service-requesting NF 300 supports mTLS, the mtlsRequired query parameter is omitted. If the service-requesting NF 300 does not support mTLS, the mtlsRequired query parameter is set to "false". If the service-requesting NF 300 supports OAuth2, the oauth2Required query parameter is omitted. If the service-requesting NF 300 does not support OAuth2, the oauth2Required query parameter is set to "false".

S603: The service-requesting NF 300 sends an Nnrf_NFDiscovery request to the NRF 200 indicating the NF type as selection criteria and the computed mtlsRequired and oauth2Required query parameters as determined in S602.

S604: The NRF 200 returns an Nnrf_NFDiscovery response, which contains a list of NF profiles matching the criteria.

S604: The service-requesting NF 300 processes and stores the received NF profiles.

Figure 8:
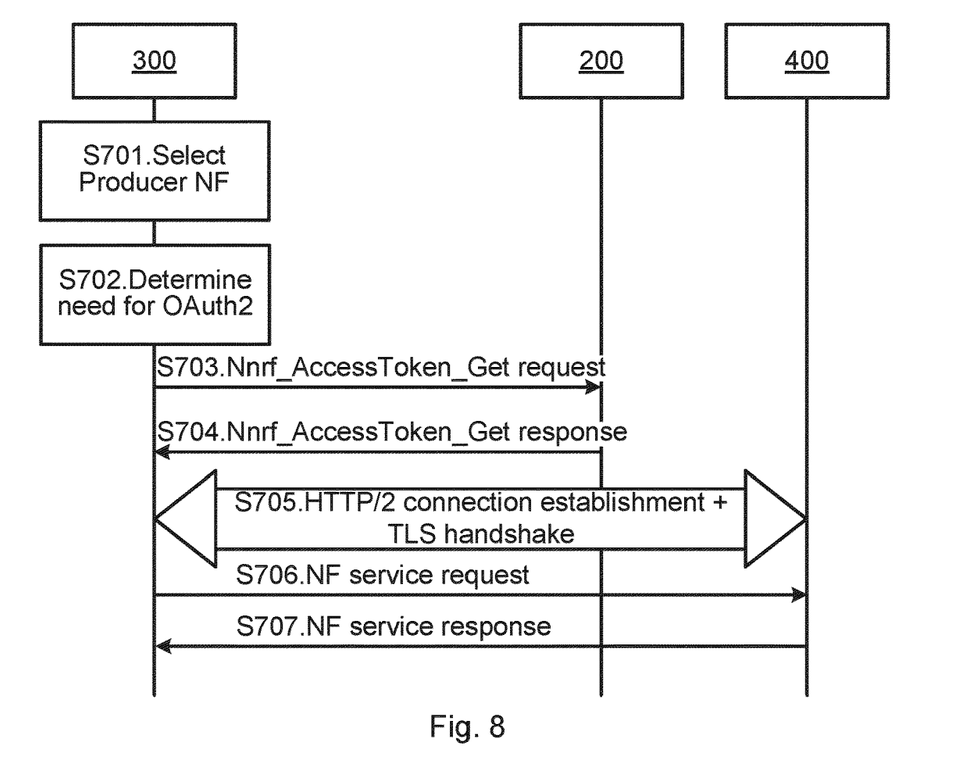

FIG. 8 is a signalling diagram for NF service invocation based on at least some of the above disclosed embodiments. It assumed that the service-requesting NF 300 uses the endpoint list received in the NRF 200 Discovery response (as received in action S503 or action S604) to select a service-providing NF 400 service endpoint.

S701: The service-requesting NF 300 selects a service-providing NF 400 to consume services from. In action S504 or action S602 the service-requesting NF 300 has already filtered out service-providing NFs 400 it cannot communicate with because of incompatible TLS modes and/or OAuth2 use.

S702: If the service-requesting NF 300 supports Oauth2, the service-requesting NF 300 checks whether the service-providing NF 400 requires OAuth2 or not by processing the oauth2Required attribute stored in action S504 or action S604. If OAuth2 is not required by the service-providing NF 400, the service-requesting NF 300 determines to not use OAuth2. If OAuth2 is required by the service-providing NF 400, the service-requesting NF 300 verifies that it is able to fetch tokens from the NRF 200 (i.e. that the connection to the NRF 200 is operational).

If OAuth2 is required and the service-requesting NF 300 is able to fetch tokens from the NRF 200, the service-requesting NF 300 determines to use OAuth2. Otherwise, the service-providing NF 400 is discarded and the rest of the actions are omitted. If the service-requesting NF 300 determined to use OAuth2, the service-requesting NF 300 sends an Nnrf_AccessToken Get request to the NRF 200, requesting an OAUth2 token for the service-providing NF 400.

S703: The NRF 200 generates an OAUth2 token and returns it to the service-requesting NF 300 in a Nnrf_AccessToken Get response.

S704: The service-requesting NF 300 established an HTTP/2 connection to the service-providing NF 400. As part of the connection establishment, a TLS handshake occurs. The TLS handshake is successful since if a client certificate is requested, the service-requesting NF 300 is able to provide it.

S705: The service-requesting NF 300 sends a service request to the service-providing NF 400 to consume one of its services. If the service-requesting NF 300 received an OAuth2 token from the NRF 200 in actions S704 and S705, it includes the OAuth2 token in the request, S706: The service-providing NF 400 validates the OAuth2 token, and returns the service invocation response.

Figure 9:
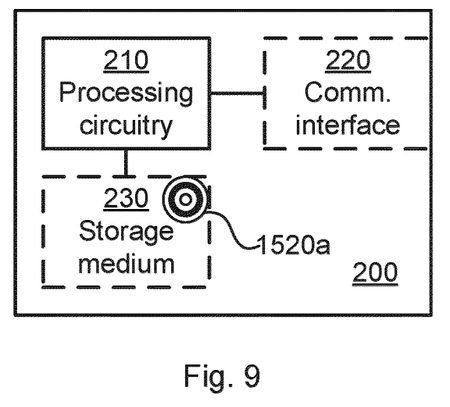
FIG. 9 is a schematic diagram showing functional units of an NRF according to an embodiment.

FIG. 9 schematically illustrates, in terms of a number of functional units, the components of an NRF 200 according to an embodiment. Processing circuitry 210 is provided using any combination of one or more of a suitable central processing unit (CPU), multiprocessor, microcontroller, digital signal processor (DSP), etc., capable of executing software instructions stored in a computer program product 1510a (as in FIG. 15), e.g. in the form of a storage medium 230. The processing circuitry 210 may further be provided as at least one application specific integrated circuit (ASIC), or field programmable gate array (FPGA).

Particularly, the processing circuitry 210 is configured to cause the NRF 200 to perform a set of operations, or actions, as disclosed above. For example, the storage medium 230 may store the set of operations, and the processing circuitry 210 may be configured to retrieve the set of operations from the storage medium 230 to cause the NRF 200 to perform the set of operations. The set of operations may be provided as a set of executable instructions. Thus, the processing circuitry 210 is thereby arranged to execute methods as herein disclosed.

The storage medium 230 may also comprise persistent storage, which, for example, can be any single one or combination of magnetic memory, optical memory, solid state memory or even remotely mounted memory.

The NRF 200 may further comprise a communications interface 220 for communications with other functions, nodes, and devices of the communication network 100. As such the communications interface 220 may comprise one or more transmitters and receivers, comprising analogue and digital components.

The processing circuitry 210 controls the general operation of the NRF 200 e.g. by sending data and control signals to the communications interface 220 and the storage medium 230, by receiving data and reports from the communications interface 220, and by retrieving data and instructions from the storage medium 230. Other components, as well as the related functionality, of the NRF 200 are omitted in order not to obscure the concepts presented herein.

Figure 10:
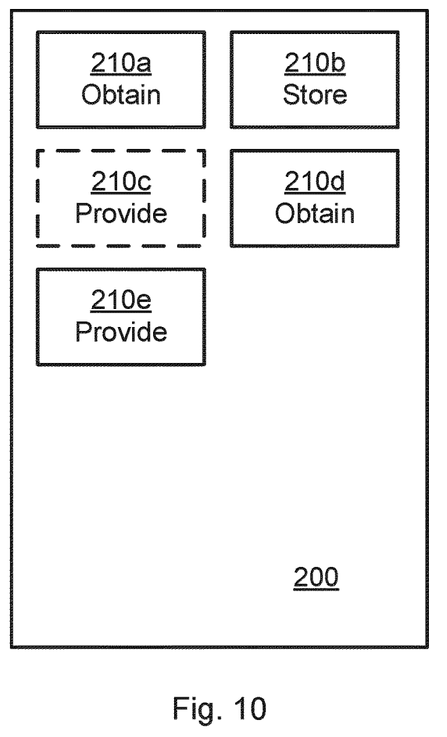
FIG. 10 is a schematic diagram showing functional modules of an NRF according to an embodiment.

FIG. 10 schematically illustrates, in terms of a number of functional modules, the components of an NRF 200 according to an embodiment. The NRF 200 of FIG. 10 comprises a number of functional modules; an obtain module 210a configured to perform action S102, a store module 210b configured to perform action S104, an obtain module 210d configured to perform action S108, and a provide module 210e configured to perform action Silo. The NRF 200 of FIG. 10 may further comprise a number of optional functional modules, such as a provide module 210C configured to perform action 5106. In general terms, each functional module 210a-210e may be implemented in hardware or in software. Preferably, one or more or all functional modules 210a-210e may be implemented by the processing circuitry 210, possibly in cooperation with the communications interface 220 and the storage medium 230. The processing circuitry 210 may thus be arranged to from the storage medium 230 fetch instructions as provided by a functional module 210a-210e and to execute these instructions, thereby performing any actions of the NRF 200 as disclosed herein.

Figure 11:
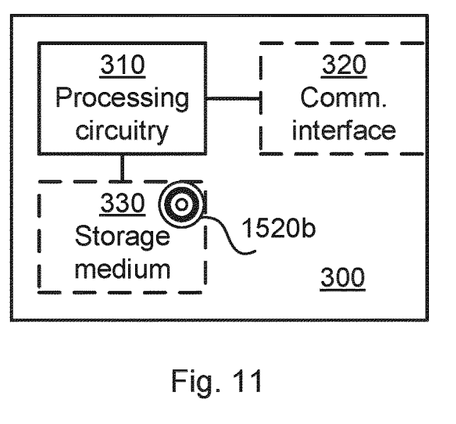
FIG. 11 is a schematic diagram showing functional units of a service-requesting NF according to an embodiment.

FIG. 11 schematically illustrates, in terms of a number of functional units, the components of a service-requesting NF 300 according to an embodiment. Processing circuitry 310 is provided using any combination of one or more of a suitable central processing unit (CPU), multiprocessor,␣␣␣microcontroller, digital signal processor (DSP), etc., capable of executing software instructions stored in a computer program product 1510b (as in FIG. 15), e.g. in the form of a storage medium 330. The processing circuitry 310 may further be provided as at least one application specific integrated circuit (ASIC), or field programmable gate array (FPGA).

Particularly, the processing circuitry 310 is configured to cause the service-requesting NF 300 to perform a set of operations, or actions, as disclosed above. For example, the storage medium 330 may store the set of operations, and the processing circuitry 310 may be configured to retrieve the set of operations from the storage medium 330 to cause the service-requesting NF 300 to perform the set of operations. The set of operations may be provided as a set of executable instructions. Thus the processing circuitry 310 is thereby arranged to execute methods as herein disclosed.

The storage medium 330 may also comprise persistent storage, which, for example, can be any single one or combination of magnetic memory, optical memory, solid state memory or even remotely mounted memory.

The service-requesting NF 300 may further comprise a communications interface 320 for communications with other functions, nodes, and devices of the communication network 100. As such the communications interface 320 may comprise one or more transmitters and receivers, comprising analogue and digital components.

The processing circuitry 310 controls the general operation of the service-requesting NF 300 e.g. by sending data and control signals to the communications interface 320 and the storage medium 330, by receiving data and reports from the communications interface 320, and by retrieving data and instructions from the storage medium 330. Other components, as well as the related functionality, of the service-requesting NF 300 are omitted in order not to obscure the concepts presented herein.

Figure 12:
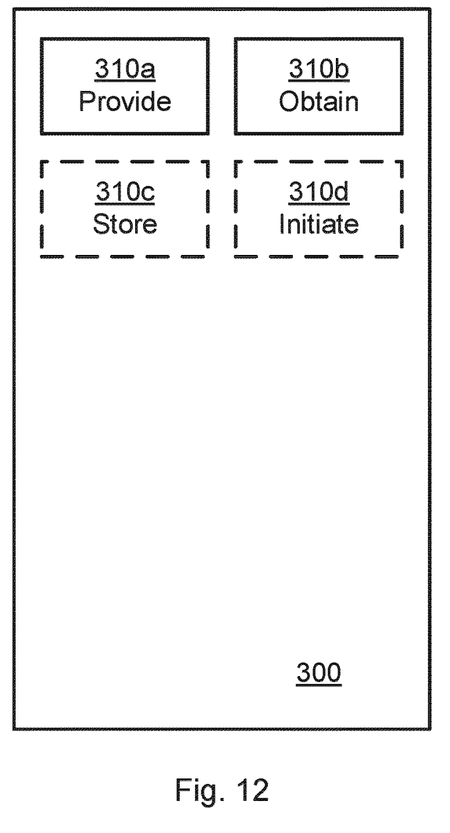
FIG. 12 is a schematic diagram showing functional modules of a service-requesting NF according to an embodiment.

FIG. 12 schematically illustrates, in terms of a number of functional modules, the components of a service-requesting NF 300 according to an embodiment. The service-requesting NF 300 of FIG. 12 comprises a number of functional modules; a provide module 310a configured to perform action S202, and an obtain module 310b configured to perform action S204. The service-requesting NF 300 of FIG. 12 may further comprise a number of optional functional modules, such as any of a store module 310c configured to perform action S206, and an initiate module 310d configured to perform action S208. In general terms, each functional module 310a-310d may be implemented in hardware or in software. Preferably, one or more or all functional modules 310a-310d may be implemented by the processing circuitry 310, possibly in cooperation with the communications interface 320 and the storage medium 330. The processing circuitry 310 may thus be arranged to from the storage medium 330 fetch instructions as provided by a functional module 310a-310d and to execute these instructions, thereby performing any actions of the service-requesting NF 300 as disclosed herein.

Figure 13:
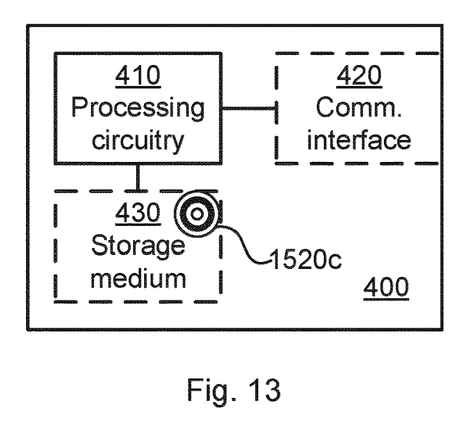
FIG. 13 is a schematic diagram showing functional units of a service-providing NF according to an embodiment.

FIG. 13 schematically illustrates, in terms of a number of functional units, the components of a service-providing NF 400 according to an embodiment. Processing circuitry 410 is provided using any combination of one or more of a suitable central processing unit (CPU), multiprocessor, microcontroller, digital signal processor (DSP), etc., capable of executing software instructions stored in a computer program product 1510c (as in FIG. 15), e.g. in the form of a storage medium 430. The processing circuitry 410 may further be provided as at least one application specific integrated circuit (ASIC), or field programmable gate array (FPGA).

Particularly, the processing circuitry 410 is configured to cause the service-providing NF 400 to perform a set of operations, or actions, as disclosed above. For example, the storage medium 430 may store the set of operations, and the processing circuitry 410 may be configured to retrieve the set of operations from the storage medium 430 to cause the service-providing NF 400 to perform the set of operations. The set of operations may be provided as a set of executable instructions. Thus the processing circuitry 410 is thereby arranged to execute methods as herein disclosed.

The storage medium 430 may also comprise persistent storage, which, for example, can be any single one or combination of magnetic memory, optical memory, solid state memory or even remotely mounted memory.

The service-providing NF 400 may further comprise a communications interface 420 for communications with other functions, nodes, and devices of the communication network 100. As such the communications interface 420 may comprise one or more transmitters and receivers, comprising analogue and digital components.

The processing circuitry 410 controls the general operation of the service-providing NF 400 e.g. by sending data and control signals to the communications interface 420 and the storage medium 430, by receiving data and reports from the communications interface 420, and by retrieving data and instructions from the storage medium 430. Other components, as well as the related functionality, of the service-providing NF 400 are omitted in order not to obscure the concepts presented herein.

Figure 14:
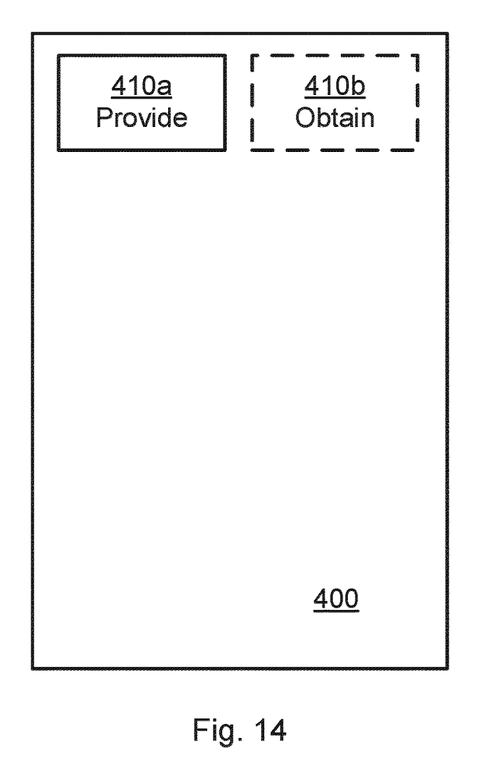
FIG. 14 is a schematic diagram showing functional modules of a service-providing NF according to an embodiment.

FIG. 14 schematically illustrates, in terms of a number of functional modules, the components of a service-providing NF 400 according to an embodiment. The service-providing NF 400 of FIG. 14 a provide module 410a configured to perform action S302. The service-providing NF 400 of FIG. 14 may further comprise a number of optional functional modules, such an obtain module 410b configured to perform action S304. In general terms, each functional module 410a-410b may be implemented in hardware or in software. Preferably, one or more or all functional modules 410a-410b may be implemented by the processing circuitry 410, possibly in cooperation with the communications interface 420 and the storage medium 430. The processing circuitry 410 may thus be arranged to from the storage medium 430 fetch instructions as provided by a functional module 410a-410b and to execute these instructions, thereby performing any actions of the service-providing NF 400 as disclosed herein.

A system comprises the NRF 200 at least one service-requesting NF 300 and at least one service-providing NF 400. Any of the NRF 200, the service-requesting NF 300 and the service-providing NF 400 may be provided as a respective standalone device or as a part of at least one further device. For example, the NRF 200, the service-requesting NF 300 and the service-providing NF 400 may be provided in a node of the core network. Alternatively, functionality of the NRF 200, the service-requesting NF 300 and the service-providing NF 400 may be distributed between at least two devices, or nodes. These at least two nodes, or devices, may either be part of the same network part (such as the radio access network or the core network) or may be spread between at least two such network parts. In general terms, instructions that are required to be performed in real time may be performed in a device, or node, operatively closer to the cell than instructions that are not required to be performed in real time.

Thus, a first portion of the instructions performed by the NRF 200, the service-requesting NF 300 and the service-providing NF 400 may be executed in a respective first device, and a second portion of the of the instructions performed by the NRF 200, the service-requesting NF 300 and the service-providing NF 400 may be executed in a respective second device; the herein disclosed embodiments are not limited to any particular number of devices on which the instructions performed by the NRF 200, the service-requesting NF 300 and the service-providing NF 400 may be executed. Hence, the methods according to the herein disclosed embodiments are suitable to be performed by a NRF 200, a service-requesting NF 300 and a service-providing NF 400 residing in a cloud computational environment. Therefore, although a single processing circuitry 210, 310, 410 is illustrated in FIGS. 9, 11, 13 the processing circuitry 210, 310, 410 may be distributed among a plurality of devices, or nodes. The same applies to the functional modules 210a-21e, 310a-310d, 410a-410b of FIGS. 10, 12, 14 and the computer programs 1520a, 1520b, 1520c of FIG. 15.

Figure 15:
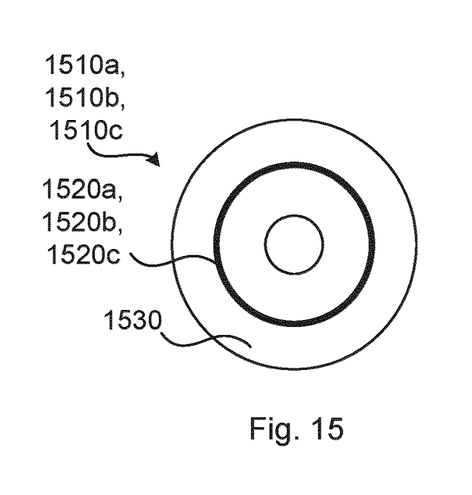
FIG. 15 shows one example of a computer program product comprising computer readable means according to an embodiment.

FIG. 15 shows one example of a computer program product 1510a, 1510b, 1510c comprising computer readable means 1530. On this computer readable means 1530, a computer program 1520a can be stored, which computer program 1520a can cause the processing circuitry 210 and thereto operatively coupled entities and devices, such as the communications interface 220 and the storage medium 230, to execute methods according to embodiments described herein. The computer program 1520a and/or computer program product 1510a may thus provide means for performing any actions of the NRF 200 as herein disclosed. On this computer readable means 1530, a computer program 1520b can be stored, which computer program 1520b can cause the processing circuitry 310 and thereto operatively coupled entities and devices, such as the communications interface 320 and the storage medium 330, to execute methods according to embodiments described herein. The computer program 1520b and/or computer program product 1510b may thus provide means for performing any actions of the service-requesting NF 300 as herein disclosed. On this computer readable means 1530, a computer program 1520c can be stored, which computer program 1520c can cause the processing circuitry 410 and thereto operatively coupled entities and devices, such as the communications interface 420 and the storage medium 430, to execute methods according to embodiments described herein. The computer program 1520c and/or computer program product 1510c may thus provide means for performing any actions of the service-providing NF 400 as herein disclosed.

In the example of FIG. 15, the computer program product 1510a, 1510b, 1510c is illustrated as an optical disc, such as a CD (compact disc) or a DVD (digital versatile disc) or a Blu-Ray disc. The computer program product 1510a, 1510b, 1510c could also be embodied as a memory, such as a random access memory (RAM), a read-only memory (ROM), an erasable programmable read-only memory (EPROM), or an electrically erasable programmable read-only memory (EEPROM) and more particularly as a non-volatile storage medium of a device in an external memory such as a USB (Universal Serial Bus) memory or a Flash memory, such as a compact Flash memory. Thus, while the computer program 1520a, 1520b, 152oc is here schematically shown as a track on the depicted optical disk, the computer program 1520a, 1520b, 1520c can be stored in any way which is suitable for the computer program product 1510a, 1510b, 1510c.

The inventive concept has mainly been described above with reference to a few embodiments. However, as is readily appreciated by a person skilled in the art, other embodiments than the ones disclosed above are equally possible within the scope of the inventive concept, as defined by the appended patent claims.

The invention claimed is:

1. A method for enabling selection of service-providing Network Functions (NFs) in a 3GPP communication network, the method being performed by a Network Repository Function (NRF), the method comprising:
    obtaining one register request from each of the service-providing NFs, wherein each registration request comprises an NF profile, and wherein each NF profile comprises a security setting attribute;
    storing the NF profiles of the service-providing NFs;
    obtaining a discovery request from a service-requesting NF, the request indicating an NF type, wherein the discovery request comprises information of security setting attribute support at the service-requesting NF, and wherein only those NF profiles of which the security setting attribute matches the information of security setting attribute support are comprised in the discovery response; and
    providing a discovery response to the service-requesting NF, wherein the discovery response comprises the NF profile of at least one of the service-providing NFs of the NF type, thereby enabling selection of the service-providing NFs.

2. The method according to claim 1, further comprising:
    providing a register response to each of the service-providing NFs upon having stored the NF profiles.

3. The method according to claim 1, wherein the security setting attribute is represented by a Boolean or value enumeration defining whether Oauth2-based authorization is required or not, and/or is represented by a Boolean defining whether mutual TLS authorization is required or not.

4. The method according to claim 1, wherein the security setting attribute is set per NF profile.

5. The method according to claim 1, wherein the security setting attribute is set per service of the NF profile.

6. A method for selection of a service-providing Network Function (NF) in a 3GPP communication network, the method being performed by a service-requesting NF, the method comprising:
    providing a discovery request to a Network Repository Function (NRF), the request indicating an NF type, wherein the discovery request comprises information of security setting attribute support at the service-requesting NF, and wherein only those NF profiles of which the security setting attribute matches the information of security setting attribute support are comprised in the discovery response; and
    obtaining a discovery response from the NRF, wherein the discovery response comprises at least one NF profile of at least one service-providing NF of the NF type, and wherein each at least one NF profile comprises a security setting attribute, the service-requesting NF thereby being enabled to select the service-providing NF.

7. The method according to claim 6, further comprising:
    storing the at least one NF profile only when its security setting attribute is supported at the service-requesting NF, and otherwise discarding the at least one NF profile.

8. The method according to claim 6, wherein the information of security setting attribute support is determined by checking which security setting attributes the service-requesting NF supports, and wherein the information of security setting attribute support lists only those security setting attributes that the service-requesting NF supports.

9. The method according to claim 6, further comprising:
   initiating establishment of an operational connection only to one of the at least one service-providing NF for which the security setting attribute is supported at the service-requesting NF.

10. A method for enabling selection of a service-providing Network Function (NF) in a 3GPP communication network, the method being performed by the service-providing NF, the method comprising:
    providing a register request to a Network Repository Function (NRF), wherein the registration request comprises an NF profile, wherein the NF profile comprises a security setting attribute, and wherein the security setting attribute pertains to support of mutual TLS and/or support of use of OAuth2-based authorization.

11. The method according to claim 10, further comprising:
    obtaining a register response from the NRF upon having provided the NF profiles to the NRF.

12. A Network Repository Function (NRF) for enabling selection of service-providing Network Functions (NFs) in a 3GPP communication network, the NRF comprising processing circuitry, the processing circuitry being configured to cause the NRF to:
    obtain one register request from each of the service-providing NFs, wherein each registration request comprises an NF profile, and wherein each NF profile comprises a security setting attribute;
    store the NF profiles of the service-providing NFs;
    obtain a discovery request from a service-requesting NF, the request indicating an NF type, wherein the discovery request comprises information of security setting attribute support at the service-requesting NF, and wherein only those NF profiles of which the security setting attribute matches the information of security setting attribute support are comprised in the discovery response; and
    provide a discovery response to the service-requesting NF, wherein the discovery response comprises the NF profile of at least one of the service-providing NFs of the NF type, thereby enabling selection of the service-providing NFs.

13. A service-requesting Network Function (NF) for selection of a service-providing NF in a 3GPP communication network, the service-requesting NF comprising processing circuitry, the processing circuitry being configured to cause the service-requesting NF to:
    provide a discovery request to a Network Repository Function (NRF), the request indicating an NF type, wherein the discovery request comprises information of security setting attribute support at the service-requesting NF, and wherein only those NF profiles of which the security setting attribute matches the information of security setting attribute support are comprised in the discovery response; and
    obtain a discovery response from the NRF, wherein the discovery response comprises at least one NF profile of at least one service-providing NF of the NF type, and wherein each at least one NF profile comprises a security setting attribute, the service-requesting NF thereby being enabled to select the service-providing NF.

14. A service-providing Network Function (NF) for enabling selection of the service-providing NF in a 3GPP communication network, the service-providing NF comprising processing circuitry, the processing circuitry being configured to cause the service-providing NF to:
    provide a register request to a Network Repository Function (NRF), wherein the registration request comprises an NF profile, wherein the NF profile comprises a security setting attribute, and wherein the security setting attribute pertains to support of mutual TLS and/or support of use of OAuth2-based authorization.

* * * * *